United States Patent
Kitano

(10) Patent No.: US 12,466,252 B2
(45) Date of Patent: Nov. 11, 2025

(54) VEHICLE WITH EXHAUST PURIFICATION DEVICE

(71) Applicant: TOYOTA JIDOSHA KABUSHIKI KAISHA, Toyota (JP)

(72) Inventor: Yutaro Kitano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/393,685

(22) Filed: Dec. 22, 2023

(65) Prior Publication Data

US 2024/0239185 A1    Jul. 18, 2024

(30) Foreign Application Priority Data

Jan. 12, 2023  (JP) ................. 2023-003051

(51) Int. Cl.
  *B60K 13/04*  (2006.01)
  *B60K 15/03*  (2006.01)
  *B60K 15/063*  (2006.01)
  *B60K 15/067*  (2006.01)
  *F01N 13/00*  (2010.01)

(52) U.S. Cl.
  CPC .......... *B60K 13/04* (2013.01); *F01N 13/0093* (2014.06); *F01N 13/0097* (2014.06); *B60K 2015/03118* (2013.01); *B60K 2015/0636* (2013.01); *B60K 15/067* (2013.01); *F01N 2340/02* (2013.01); *F01N 2340/04* (2013.01); *F01N 2610/02* (2013.01); *F01N 2610/1406* (2013.01)

(58) Field of Classification Search
  CPC combination set(s) only.
  See application file for complete search history.

(56) References Cited

U.S. PATENT DOCUMENTS

| | | | |
|---|---|---|---|
| 5,658,013 A * | 8/1997 | Bees .................. | B60K 15/03 280/834 |
| 5,950,750 A * | 9/1999 | Dong .................. | B60K 17/344 180/24.09 |
| 8,882,150 B2 * | 11/2014 | Yamada .................. | B60G 7/02 280/784 |
| 2009/0094968 A1 * | 4/2009 | Ikegami .................. | F01N 13/1822 60/310 |
| 2013/0008733 A1 * | 1/2013 | Gleyzes .................. | B60L 3/0061 903/903 |
| 2014/0191498 A1 * | 7/2014 | Shipp .................. | B60K 15/073 280/834 |
| 2018/0354354 A1 * | 12/2018 | Jin .................. | B60K 7/0007 |
| 2021/0300168 A1 * | 9/2021 | Kohara .................. | B60K 17/22 |

FOREIGN PATENT DOCUMENTS

JP      2017039362 A     2/2017

* cited by examiner

*Primary Examiner* — Binh Q Tran

(57) ABSTRACT

A vehicle includes first and second side members spaced apart from each other in a width direction of the vehicle and extending in a front-rear direction of the vehicle, a propeller shaft disposed between the first and second side members, gas fuel tanks disposed between the first and second side members and arranged side by side in the width direction with the propeller shaft located in between, and an exhaust purification device disposed outward from the first side member in the width direction.

8 Claims, 2 Drawing Sheets

VEHICLE WITH EXHAUST PURIFICATION DEVICE

BACKGROUND

1. Field

The present disclosure relates to a vehicle with an exhaust purification device.

2. Description of Related Art

Japanese Laid-Open Patent Publication No. 2017-39362 discloses a vehicle that includes a pair of side members spaced apart from each other in the width direction of the vehicle and extending in a front-rear direction of the vehicle. A propeller shaft is disposed between the two side members. Gas fuel tanks are disposed between the two side members. The gas fuel tanks are arranged side by side in the width direction, with the propeller shaft located in between. An exhaust purification device that purifies exhaust gas is disposed between the two side members.

In the vehicle described in the above publication, the gas fuel tanks and the exhaust purification device are located between the two side members. Thus, if an increase to the capacity of each gas fuel tank is attempted, there is a risk that there will be insufficient space to accommodate the exhaust purification device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle according to an aspect includes two side members spaced apart from each other in a width direction of the vehicle and extending in a front-rear direction of the vehicle, one of the two side members being referred to as a first side member and the other one of the two side members being referred to as a second side member, a propeller shaft disposed between the first side member and the second side member, gas fuel tanks disposed between the first side member and the second side member and arranged side by side in the width direction with the propeller shaft located in between, and an exhaust purification device disposed outward from the first side member in the width direction.

In this configuration, the exhaust purification device is located outward from the first side member in the width direction, instead of being located between the first and second side members. Thus, even if the capacity of the gas fuel tanks is increased, sufficient space for accommodating the exhaust purification device is provided.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle according to an embodiment will now be described with reference to FIGS. 1 and 2. Arrow FR shown in FIGS. 1 and 2 indicates a front side of the vehicle, and arrow RR indicates a rear side of the vehicle. Further, arrow W shown in FIG. 1 indicates the width direction of the vehicle. Furthermore, arrow TOP shown in FIG. 2 indicates the upper side of the vehicle, and arrow DOWN indicates the lower side of the vehicle.

Configuration of Vehicle

Figure 1:
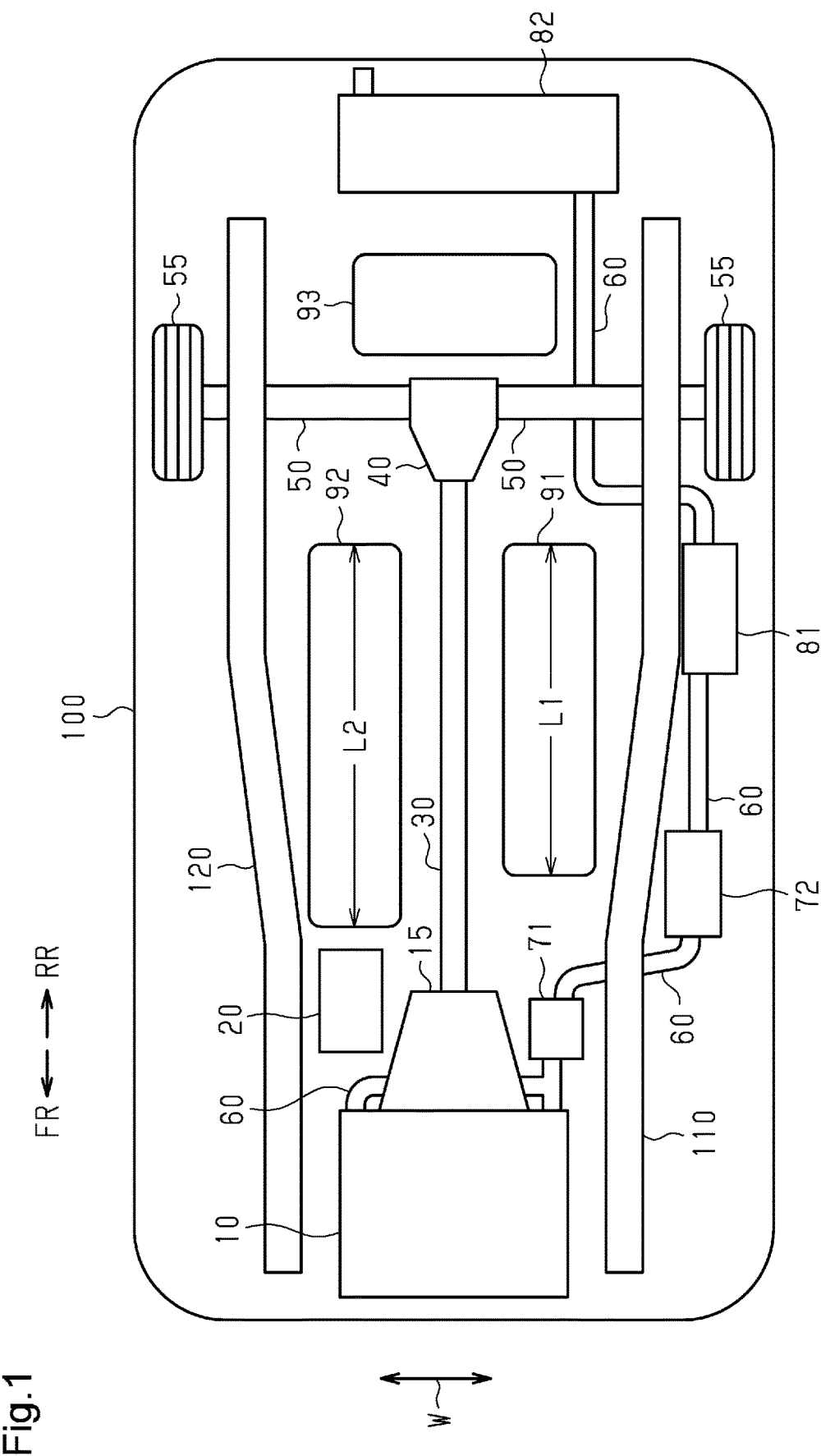
FIG. 1 is a top view of a vehicle according to an embodiment.

As shown in FIG. 1, a vehicle 100 includes a pair of side members 110, 120 spaced apart from each other in the width direction and extending in a front-rear direction of the vehicle 100. One of the two side members 110, 120 is referred to as a first side member 110, and the other of the two side members 110, 120 is referred to as a second side member 120.

An internal combustion engine 10 and a transmission 15 are disposed at a front portion of the vehicle 100 between the two side members 110, 120 (i.e., between the first side member 110 and the second side member 120).

The internal combustion engine 10 is an engine that uses hydrogen gas, which is gas, as fuel.

A propeller shaft 30 is connected to the transmission 15. The propeller shaft 30 is located between the first side member 110 and the second side member 120. Specifically, the propeller shaft 30 is located at a central portion in the width direction and extends rearward from the transmission 15. The propeller shaft 30 is connected to a differential gear 40. The differential gear 40 is located at a rear portion of the vehicle 100.

The differential gear 40 is connected to a drive shaft 50. The drive shaft 50 is connected to rear wheels 55, which are drive wheels.

The vehicle 100 includes gas fuel tanks that store gas fuel in the internal combustion engine 10. For example, the vehicle 100 of the present embodiment includes a first gas fuel tank 91, a second gas fuel tank 92, and a third gas fuel tank 93. In the present embodiment, each of the first gas fuel tank 91, the second gas fuel tank 92, and the third gas fuel tank 93 has a cylindrical shape but may have a different shape.

The first gas fuel tank 91 and the second gas fuel tank 92 are located between the first side member 110 and the second side member 120. Further, the first gas fuel tank 91 and the second gas fuel tank 92 are arranged side by side in the width direction, with the propeller shaft 30 located in between.

Specifically, the first gas fuel tank 91 is located between the propeller shaft 30 and the first side member 110. The second gas fuel tank 92 is located between the propeller shaft 30 and the second side member 120.

The overall length L1 of the first gas fuel tank 91 in the front-rear direction is shorter than the overall length L2 of the second gas fuel tank 92 in the front-rear direction.

The third gas fuel tank 93 is located rearward from the drive shaft 50 and frontward from a main muffler 82 (described later).

An exhaust passage 60 is connected to an exhaust port of the internal combustion engine 10. The direction in which exhaust gas flows through the exhaust passage 60 is referred to as an exhaust direction. An oxidation catalyst 71, a selective catalytic reduction catalyst (hereinafter referred to as an SCR catalyst) 72, a sub-muffler 81, and a main muffler 82 are arranged in the exhaust passage 60 in this order from the upstream side with respect to the flow of exhaust gas.

The oxidation catalyst 71 corresponds to a second exhaust purification device. The oxidation catalyst 71 is a device that raises the temperature of exhaust gas when supplied with an oxidizing agent such as fuel. The oxidation catalyst 71 is located between the first side member 110 and the second side member 120. Specifically, the oxidation catalyst 71 is located on the side of the propeller shaft 30 where the first gas fuel tank 91 is located, and more specifically, the oxidation catalyst 71 is located frontward from the first gas fuel tank 91.

The SCR catalyst 72 corresponds to a first exhaust purification device. The SCR catalyst 72 is a device that reduces and removes NOx in the exhaust gas using a reducing agent. The SCR catalyst 72 is located outward from the first side member 110, which is one of the two side members, in the width direction. Specifically, the SCR catalyst 72 is arranged so as not to overlap the first side member 110 in a top view of the vehicle 100.

Figure 2:
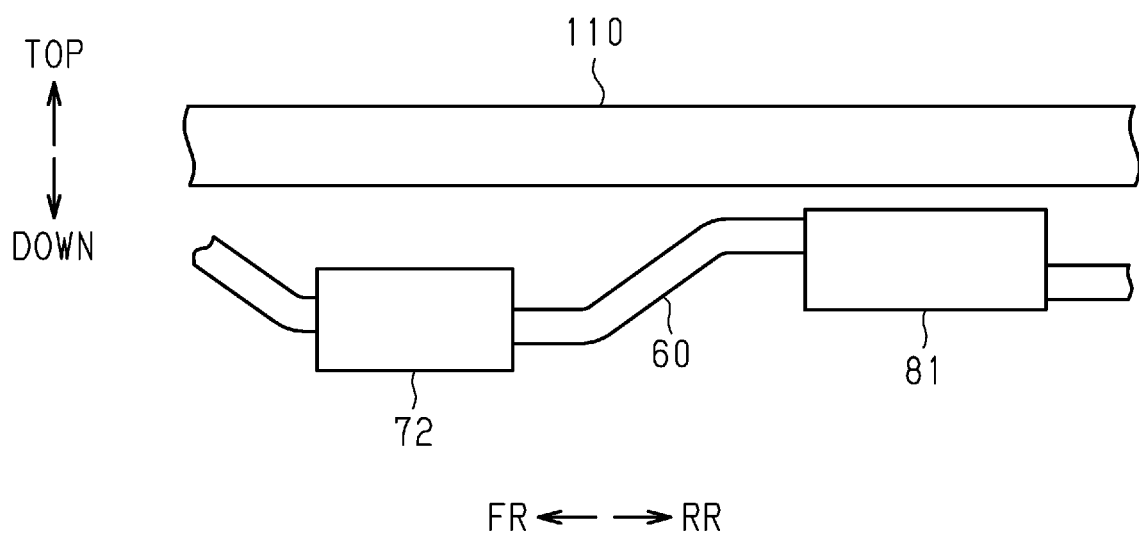
FIG. 2 is a side view of the vehicle according to the embodiment.

As shown in FIG. 2, the SCR catalyst 72 is located below the first side member 110 in a side view of the vehicle 100.

The sub-muffler 81 is a first noise abatement device that reduces exhaust noise. The sub-muffler 81 is located outward from the first side member 110 in the width direction.

The main muffler 82 is a second noise abatement device that reduces exhaust noise. The main muffler 82 has a larger capacity than the sub-muffler 81. The main muffler 82 is located at a rear portion of the vehicle 100 and at a substantially central portion in the width direction.

The vehicle 100 includes a urea water tank 20 that stores urea water that is added to exhaust gas in the internal combustion engine 10. The urea water is added to the exhaust gas from a portion upstream of the SCR catalyst 72 in the exhaust passage 60. Ammonia is generated from the urea water that has been added to the exhaust gas. The ammonia is used as a reducing agent to reduce and remove NOx in the SCR catalyst 72. Specifically, the urea water tank 20 is located on the side of the propeller shaft 30 where the second gas fuel tank 92 is located, and more specifically, the urea water tank 20 is located frontward from the second gas fuel tank 92.

Operation and Advantages

The operation and advantages of the present embodiment will now be described.

(1) The vehicle 100 includes the gas fuel tanks 91, 92, which are located between the first and second side members 110, 120. The SCR catalyst 72 of the present embodiment is located outward from the first side member 110 in the width direction, instead of being located between the first and second side members 110, 120. Thus, even if the capacity of the gas fuel tanks 91, 92 is increased, sufficient space for accommodating the SCR catalyst 72 is provided.

(2) If the SCR catalyst 72 were to be located between the first and second side members 110, 120, the SCR catalyst 72 would be adjacent to a gas fuel tank. In this case, the gas fuel tank may be thermally damaged by the heat of the SCR catalyst 72. In the present embodiment, the SCR catalyst 72, which is a heat source, is located outward from the first side member 110 in the width direction. Thus, the SCR catalyst 72 is located at a position separated from the gas fuel tanks 91, 92. This reduces the heat damage to the gas fuel tanks 91, 92 from the SCR catalyst 72.

(3) In general, a passenger compartment is often disposed above side members of the vehicle 100. When the side members and the SCR catalyst 72 overlap each other in a top view of the vehicle 100, that is, when the SCR catalyst 72 is located above the side members, the heat of the SCR catalyst 72 may be transmitted to the passenger compartment. In the present embodiment, the SCR catalyst 72 and the first side member 110 are arranged so as not to overlap each other in a top view of the vehicle 100, and the SCR catalyst 72 is not located above the first side member 110. Specifically, the SCR catalyst 72 is located below the first side member 110 in a side view of the vehicle 100. This limits the transfer of the heat from the SCR catalyst 72 to the passenger compartment.

(4) The internal combustion engine 10 and the oxidation catalyst 71 are located between the first and second side members 110, 120. Thus, the oxidation catalyst 71 is located at a position closer to the internal combustion engine 10 than in a case in which the oxidation catalyst 71 is disposed outward from the side members in the width direction. This shortens the exhaust passage 60 connecting the internal combustion engine 10 with the oxidation catalyst 71. As a result, the warm-up performance of the oxidation catalyst 71 is improved.

(5) Noise abatement devices such as the sub-muffler 81 and the main muffler 82 are disposed in the exhaust passage 60. Thus, as compared with when only one noise abatement device is disposed, the sound suppression performance is improved and the exhaust pressure loss is reduced. The sub-muffler 81 is located outward from the first side member 110 in the width direction. Thus, interference between the sub-muffler 81 and the first gas fuel tank 91 is avoided. This provides a sufficient capacity of the sub-muffler 81 without reducing the capacity of the first gas fuel tank 91.

(6) If the third gas fuel tank 93 were to be located rearward from the main muffler 82, the air heated by the heat released from the main muffler 82 would flow toward the rear due to the traveling wind, thereby heating the third gas fuel tank 93. In the present embodiment, since the third gas fuel tank 93 is located frontward from the main muffler 82, the heating of the third gas fuel tank 93 is limited.

(7) If the oxidation catalyst 71 and the urea water tank 20 were to be both located on the side of the propeller shaft 30 where the first gas fuel tank 91 is located, the first gas fuel tank 91 would be accommodated in a smaller space. Similarly, if the oxidation catalyst 71 and the urea water tank 20 were to be both located on the side of the propeller shaft 30 where the second gas fuel tank 92 is located, the second gas fuel tank 92 would be accommodated in a smaller space.

In the present embodiment, the oxidation catalyst 71 is located on the side of the propeller shaft 30 where the first gas fuel tank 91 is located, and the urea water tank 20 is located on the side of the propeller shaft 30 where the second gas fuel tank 92 is located. This limits the reduction in the space for accommodating the gas fuel tanks.

(8) The overall length of the first gas fuel tank 91, which is located between the first side member 110 and the propeller shaft 30, is shorter than the overall length of the second gas fuel tank 92, which is located between the second side member 120 and the propeller shaft 30. Accordingly, as compared with when the gas fuel tanks have the same overall length, there is a larger space for accommodating the oxidation catalyst 71, which is located between the first side member 110 and the propeller shaft 30.

Modifications

The above embodiment may be modified as follows. The above embodiment and the following modifications can be combined as long as the combined modifications remain technically consistent with each other.

The first side member 110 and the SCR catalyst 72 may be arranged so as to overlap each other in a top view of the vehicle 100. This provides the operation and advantages other than advantage (3).

The oxidation catalyst 71 may be located outward from the first side member 110 in the width direction. This provides the operation and advantages other than advantage (4).

The sub-muffler 81 may be located between the first and second side members 110, 120. This provides the operation and advantages other than advantage (5).

The third gas fuel tank 93 may be located rearward from the main muffler 82. This provides the operation and advantages other than advantage (6).

The oxidation catalyst 71 and the urea water tank 20 may be both located on the side of the propeller shaft 30 where the first gas fuel tank 91 is located. Further, the oxidation catalyst 71 and the urea water tank 20 may be both located on the side of the propeller shaft 30 where the second gas fuel tank 92 is located. This provides the operation and advantages other than advantage (7).

The first gas fuel tank 91 and the second gas fuel tank 92 may have the same overall length. This provides the operation and advantages other than advantage (8).

The third gas fuel tank 93 may be omitted.

Instead of hydrogen gas, the gas fuel may be another type of gas fuel such as compressed natural gas.

The number of exhaust purification devices and/or the number of noise abatement devices included in the vehicle 100 may be changed.

Instead of an oxidation catalyst, the second exhaust purification device may be another type of exhaust purification device.

Instead of an SCR catalyst, the first exhaust purification device may be another type of exhaust purification device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle, comprising:
    two side members spaced apart from each other in a width direction of the vehicle and extending in a front-rear direction of the vehicle, one of the two side members being referred to as a first side member and the other one of the two side members being referred to as a second side member;
    a propeller shaft disposed between the first side member and the second side member;
    gas fuel tanks disposed between the first side member and the second side member and arranged side by side in the width direction with the propeller shaft located in between; and
    an exhaust purification device disposed outward from the first side member in the width direction.

2. The vehicle according to claim 1, wherein the exhaust purification device and the first side member are arranged so as not to overlap each other in a top view of the vehicle.

3. The vehicle according to claim 1, wherein the exhaust purification device is located below the first side member in a side view of the vehicle.

4. The vehicle according to claim 1, further comprising an internal combustion engine disposed between the first side member and the second side member, wherein
    the exhaust purification device is referred to as a first exhaust purification device, and a direction in which exhaust gas flows through an exhaust passage of the internal combustion engine is referred to as an exhaust direction,
    a second exhaust purification device is disposed in the exhaust passage, the second exhaust purification device being located upstream of the first exhaust purification device in the exhaust direction, and
    the second exhaust purification device is located between the first side member and the second side member.

5. The vehicle according to claim 4, wherein
    a first noise abatement device and a second noise abatement device are connected to the exhaust passage,
    the first noise abatement device is located outward from the first side member in the width direction, and
    the second noise abatement device is located at a rear portion in the vehicle.

6. The vehicle according to claim 5, wherein a gas fuel tank that is different from the gas fuel tanks is located frontward from the second noise abatement device.

7. The vehicle according to claim 4, wherein
    the vehicle includes a urea water tank that stores urea water that is added to exhaust gas in the internal combustion engine,
    the gas fuel tanks include a first gas fuel tank located between the first side member and the propeller shaft and a second gas fuel tank located between the second side member and the propeller shaft,
    the second exhaust purification device is located on a side of the propeller shaft where the first gas fuel tank is located, and
    the urea water tank is located on a side of the propeller shaft where the second gas fuel tank is located.

8. The vehicle according to claim 7, wherein an overall length of the first gas fuel tank in the front-rear direction is shorter than an overall length of the second gas fuel tank in the front-rear direction.

* * * * *